Patented July 11, 1933

1,917,646

UNITED STATES PATENT OFFICE

OTTO HERRMANN, OF WIESBADEN, GERMANY, ASSIGNOR TO KALLE & CO. AKTIEN-GESELLSCHAFT, OF WIESBADEN-BIEBRICH, GERMANY, A CORPORATION OF GERMANY

METHOD OF MAKING VISCOSE

No Drawing. Application filed May 29, 1931, Serial No. 541,116, and in Germany May 31, 1930.

This invention relates to cellulosic solutions, such as viscose, suitable for use in the manufacture of threads, films, and other regenerated cellulose structures. More particularly, it relates to a process of preparing a viscose solution suitable for the purposes enumerated.

Prior to this invention, the viscose employed in the production of threads, films, and other structures was prepared by xanthating aged or ripened shredded alkali cellulose and then dissolving the cellulose xanthate in an alkali solution, such as an aqueous solution of sodium hydroxide. The viscose was then filtered, ripened and de-aerated, after which it was in proper condition for use.

As hereinbefore mentioned, the alkali cellulose, prior to being xanthated, was aged, that is, the alkali cellulose was subjected to constant temperature conditons (20° C.-25° C.), depending on the cellulosic raw material employed, for approximately 48 to 72 hours. The purpose of the ageing was to greatly decrease the viscosity of a viscose solution prepared from the alkali cellulose. For instance, if a viscose solution is prepared from unripened alkali cellulose, the viscosity thereof (over 2000 seconds) can scarcely be determined with a ball viscosimeter. It is obvious that such a viscose cannot successfully be used for spinning, casting, etc. On the other hand, if the alkali cellulose prepared from the same raw material as the unripened alkali cellulose previously mentioned is aged for approximately 50 to 60 hours under suitable conditions, a viscose solution prepared therefrom has a viscosity of approximately 40 to 60 seconds on the ball viscosimeter and can be used for spinning, casting, etc.

Usually, the ageing step was carried out by disposing shredded alkali cellulose in cans or bins which were stored for the requisite period of time in a large room in which the desired conditions were closely controlled. The length of time required for the ageing and the temperature at which the room was held depended, to a great extent, on the cellulosic raw material. Thus, it was essential to use raw materials of substantially definite characteristics in order to secure a viscose of uniform properties.

It has now been found that the same decrease in viscosity of a viscose solution may be secured without producing any unfavorable influence on the quality of the product, i. e. threads, films, etc., prepared therefrom and without ageing the alkali cellulose, by xanthating a green alkali cellulose and then dissolving the cellulose xanthate in an alkali solution, such as an aqueous solution of sodium hydroxide, in the presence of oxygen, and preferably under pressure.

It is, therefore, an object of this invention to prepare a viscose solution, suitable for use in the production of threads, films, and other regenerated cellulose structures, without submitting the alkali cellulose to ageing.

Another object of this invention is to provide a method of preparing a viscose solution, suitable for use in the production of threads, films, and other regenerated cellulose structures, which comprises xanthating a green alkali cellulose and dissolving the resultant cellulose xanthate in an alkali solution in the presence of oxygen.

A specific object of this invention is to prepare a viscose solution, suitable for use in the production of threads, films, etc., which comprises xanthating a green alkali cellulose and dissolving the cellulose xanthate in the presence of oxygen and under pressure.

Further objects will appear from the following description and appended claims.

The present invention contemplates the production of a viscose solution having a viscosity which permits its use in the manufacture of threads, films, and other regenerated cellulose structures without the necessity of ageing the alkali cellulose. This is achieved in accordance with the principles of this invention by xanthating a green alkali cellulose and then dissolving the cellulose xanthate in an alkali solution in the presence of oxygen or gases containing oxygen. Agitation and stirring are employed to facilitate the dissolving of the xanthate in the alkali solution. Because of this, the oxygen is thoroughly mixed and indeed emulsified in the mass, with the result that it decreases the viscosity to such an extent that during the entire dissolving operation viscose of extremely high and excessively great consistency is not produced. The dissolving operation is accelerated and sets in uniformly.

In many instances it is advantageous to carry out the dissolving of the xanthate under pressure, and in the preferred form an elevated pressure is employed.

To successfully carry out the process and produce a viscose solution of suitable viscosity, it is not necessary to use definite raw materials. By regulating the quantity of oxygen brought into the reaction during the dissolving of the xanthate in the alkali solution, which may be secured by changing the time of reaction, concentration and/or pressure and temperature, viscose solutions of substantially uniform characteristics may be secured from any suitable cellulosic raw material.

In order to more fully explain the present invention, one specific embodiment is hereafter set forth. It is to be understood that this specific procedure is not limitative of the invention but merely illustrates one modification thereof which has given satisfactory results.

Alkali cellulose produced and shredded in the usual well-known manner is converted directly into cellulose xanthate by treatment with the required proportion of carbon bisulphide. The xanthate is then dissolved in an alkali solution, such as an aqueous solution of sodium hydroxide of requisite concentration in a closed container, the mass being stirred very thoroughly during the operation. Before or during the dissolving of the xanthate, the air in the container is partly or entirely displaced by oxygen and the pressure therein increased to approximately two atmospheres, the latter being determined by the quantity of oxygen introduced.

During the dissolving action, the viscosity of the solution decreases uniformly after passing a maximum and may be measured with approximate accuracy by the power consumption of the agitating device. The rate at which the viscosity decreases may be varied either by changing the excess pressure or by displacing more or less completely the air over the mass. For example, if a solution of desired viscosity is to be effected within 5 hours, the operation may be carried out so that the maximum viscosity is attained and passed after approximately 1½ to 2 hours. When the desired viscosity of the solution is reached, which in the case just mentioned is obtained in approximately 5 hours, agitation and further action by the oxygen is discontinued, for instance, by removing the oxygen from the reaction vessel by suction or evacuation or by replacing the oxygen by an inert or reducing gas, such as, for instance, hydrogen or nitrogen. Subsequently, the solution, after the usual steps of filtering, ripening and evacuation, may be spun or cast, as desired.

The term "green alkali cellulose" as employed in this specification is intended to cover fresh or unaged (unripened) or mildly aged (mildly ripened) alkali cellulose.

From the foregoing it is apparent that this process possesses many advantages. Due to the fact that ageing of the alkali cellulose is not essential for the successful practice of this invention, the cans or bins, the large room, and means for controlling the temperature conditions therein become unnecessary. The time usually expended for ageing is saved with the result that the process of producing threads, films, and other structures from regenerated cellulose is considerably shortened. Consequently, the process is more economical than those previously used.

In the actual practice of the present invention, it is no longer necessary to use definite pulps in order to obtain the most uniform viscosity possible, as was necessary in the processes wherein ageing of the alkali cellulose was an essential. By the present process it is possible to produce viscose solutions of uniform viscosity from various pulps by merely regulating the quantity of oxygen brought into the reaction during the dissolving operation. Furthermore, fewer toxic gases are produced in working the viscose solution prepared in accordance with this invention than when viscose prepared by the other process is employed. Most surprising of all, the threads, films, and the like produced from the viscose prepared in accordance with this invention possess greater mechanical strength than those which are obtained by employing solutions in which the viscosity of the same material was decreased by ageing the alkali cellulose.

It is known that viscose absorbs oxygen and consequently its viscosity is decreased. Likewise, it is known also that a viscose with a greatly decreased viscosity may be obtained from pulp which has undergone a preliminary treatment with oxidizing agents. However, it could not be foreseen or predicted that a decrease in viscosity of a viscose solution, equal or similar to that obtained by ageing of alkali cellulose, could be produced by the action of oxygen on the dissolving xanthate without making the dissolving operation more difficult and longer, and that the threads, films, and the like produced from this solution would be of even better quality and stronger. In all experiments carried out up to the present time to decrease the viscosity of viscose solutions by other means than the so-called ageing of the alkali cellulose, threads or films have also been obtained which were of greatly inferior quality, damaged and/or practically useless.

Since it is obvious that various changes and modifications may be made in the above description without departing from the nature and spirit thereof, this invention is not restricted thereto except as defined in the appended claims.

I claim:

1. A method of preparing viscose solutions suitable for the manufacture of threads, films and other regenerated cellulose structures which comprises treating green alkali cellulose with carbon bisulphide, dissolving the cellulose xanthate in an alkali solution in the presence of oxygen and removing the oxygen when the viscose solution has acquired the desired viscosity.

2. A method of preparing viscose solutions suitable for the manufacture of threads, films and other regenerated cellulose structures which comprises treating unaged alkali cellulose with carbon bisulphide, dissolving the cellulose xanthate in an alkali solution in the presence of oxygen and removing the oxygen when the viscose solution has acquired the desired viscosity.

3. A method of preparing viscose solutions suitable for the manufacture of threads, films and other regenerated cellulose structures which comprises treating mildly ripened alkali cellulose with carbon bisulphide, dissolving the cellulose xanthate in an alkali solution in the presence of oxygen and removing the oxygen when the viscose solution has acquired the desired viscosity.

4. A method of preparing viscose solutions suitable for the manufacture of threads, films and other regenerated cellulose structures which comprises treating green alkali cellulose with carbon bisulphide, dissolving the cellulose xanthate in an alkali solution in the presence of oxygen and under pressure and removing the oxygen when the viscose solution has acquired the desired viscosity.

5. A method of preparing viscose solutions suitable for the manufacture of threads, films and other regenerated cellulose structures which comprises treating unaged alkali cellulose with carbon disulphide, dissolving the cellulose xanthate in an alkali solution in the presence of oxygen and under pressure and removing the oxygen when the viscose solution has acquired the desired viscosity.

6. A method of preparing viscose solutions suitable for the manufacture of threads, films and other regenerated cellulose structures which comprises treating mildly ripened alkali cellulose with carbon bisulphide, dissolving the cellulose xanthate in an alkali solution in the presence of oxygen and under pressure and removing the oxygen when the viscose solution has acquired the desired viscosity.

In testimony whereof, I have affixed my signature to this specification.

OTTO HERRMANN.